United States Patent
Cheng et al.

(10) Patent No.: US 9,507,437 B2
(45) Date of Patent: Nov. 29, 2016

(54) ALGORITHMS, SOFTWARE AND AN INTERACTION SYSTEM THAT SUPPORT THE OPERATION OF AN ON THE FLY MOUSE

(71) Applicant: AMCHAEL VISUAL TECHNOLOGY CORPORATION, Hsinchu, ROC (TW)

(72) Inventors: Kai Michael Cheng, Hsinchu (TW); Yushiuan Tsai, Guishan Township (TW); Hsien-Chang Lu, Zhongli (TW)

(73) Assignee: AMCHAEL VISUAL TECHNOLOGY CORPORATION, Hsinchu (TW)

( * ) Notice: Subject to any disclaimer, the term of this patent is extended or adjusted under 35 U.S.C. 154(b) by 205 days.

(21) Appl. No.: 14/089,881

(22) Filed: Nov. 26, 2013

(65) Prior Publication Data

US 2015/0022449 A1    Jan. 22, 2015

Related U.S. Application Data

(60) Provisional application No. 61/846,636, filed on Jul. 16, 2013.

(51) Int. Cl.
*G06F 3/0346* (2013.01)
*G06F 3/03* (2006.01)
*G06F 3/0354* (2013.01)

(52) U.S. Cl.
CPC .............. *G06F 3/0346* (2013.01); *G06F 3/03* (2013.01); *G06F 3/0304* (2013.01); *G06F 3/03543* (2013.01)

(58) Field of Classification Search
CPC .. G06F 3/0346; G06F 3/038; G06F 3/03547; G06F 3/03543; G06F 3/0304; G06F 3/03
See application file for complete search history.

(56) References Cited

U.S. PATENT DOCUMENTS 5,297,061 A * 3/1994 Dementhon .......... G06F 3/0346
                                                       345/156
5,532,777 A    7/1996 Zanen
(Continued)

OTHER PUBLICATIONS

Pranav Mistry; Mouseless, the 'invisible' computer mouse (w/Video); Phys.org; Jul. 8, 2010; 2 pages; http://phys.org/news197792915.html.

(Continued)

*Primary Examiner* — Towfiq Elahi
*Assistant Examiner* — Saifeldin Elnafia
(74) *Attorney, Agent, or Firm* — King & Schickli, PLLC

(57) ABSTRACT

Methods and systems for surface-free pointing and/or command input include a computing device operably linked to an imaging device. The imaging device can be any suitable video recording device including a conventional webcam. At least one pointing/input device is provided including a visible point light source emitting light in a wavelength defining a predetermined color. The at least one pointing/input device may be a conventional optoelectronic computer mouse. The imaging device captures one or more sequential image frames each including a view of a scene including the visible point light source. One or more software programs calculate a position and/or a motion of the at least one point light source in the captured image frames by identifying colored areas corresponding to the point light source and mapping those colored areas to a position and/or motion of a visual marker such as a cursor in a graphical user interface.

13 Claims, 10 Drawing Sheets

(56) References Cited

U.S. PATENT DOCUMENTS

| | | | |
|---|---|---|---|
| 5,909,209 A | 6/1999 | Dickinson | |
| 6,057,540 A | 5/2000 | Gordon et al. | |
| 6,072,496 A | 6/2000 | Guenter et al. | 345/419 |
| 6,525,306 B1 | 2/2003 | Bohn | |
| 6,643,396 B1 | 11/2003 | Hendriks et al. | |
| 7,274,800 B2 | 9/2007 | Nefian et al. | |
| 7,849,421 B2 | 12/2010 | Yoo et al. | |
| 8,269,721 B2 | 9/2012 | Lin | |
| 8,467,612 B2 | 6/2013 | Susca et al. | 382/202 |
| 8,907,889 B2* | 12/2014 | Sweetser | G06F 3/0325 345/156 |
| 8,913,003 B2* | 12/2014 | Grunnet-Jepsen | G06F 3/0421 345/156 |
| 2008/0100825 A1* | 5/2008 | Zalewski | A63F 13/06 356/29 |
| 2009/0315825 A1 | 12/2009 | Cauchi | |
| 2011/0310230 A1 | 12/2011 | Cheng | |

OTHER PUBLICATIONS

Pranav Mistry and Pattie Maes; "Mouseless"; MIT Media Laboratory, Oct. 2010, pp. 441-442.

"Mouse (computing)"; Wikipedia; Sep. 25, 2013; 8 pages; http://en.wikipedia.org/wiki/Mouse_(computing).

Notice of Allowance dated Aug. 19, 2015 in U.S. Appl. No. 14/104,331 for Three Dimensional Pointing Using One Camera and Three Aligned Lights.

* cited by examiner

Bottom View

ALGORITHMS, SOFTWARE AND AN INTERACTION SYSTEM THAT SUPPORT THE OPERATION OF AN ON THE FLY MOUSE

This utility patent application claims the benefit of priority in U.S. Provisional Patent Application Ser. No. 61/846,636 filed on Jul. 16, 2013, the entirety of the disclosure of which is incorporated herein by reference.

TECHNICAL FIELD

The present disclosure relates to human-computer interaction systems. More specifically, this disclosure pertains to methods and systems for use of a conventional pointing/input device for a computing system in pointing/input actions without requiring a surface over which to translate the device. In embodiments, the pointing/input device is a conventional optoelectronic or other type of computer mouse.

BACKGROUND OF THE INVENTION

The operation of a conventional mechanical or optical pointing or input device such as a mechanical or optical computer mouse is well known in the art. By use of these devices, the user can select files, programs, or actions from lists, groups of icons, etc., and can "gesturally" move files, programs, etc. issue commands or map to specific actions, for example in drawing programs.

As examples, a mechanical computer mouse relies on one or more wheels and/or balls to track movement or displacement information relative to forward-backward and left-to-right movement of the computer mouse, for example by interrupting infrared beams of light directed at light sensors to create pulses representative of wheel or ball movement. Simple logic circuits interpret the relative timing of the pulses to indicate which direction the wheel(s) or ball(s) is moving, which is then converted by driver software into motion of a visual indicator such as a pointer, cursor, or cross-hair along X and Y axes of a computing device display screen.

An optical computer mouse replaces the mechanical mouse wheels or balls with one or more light sources such as light-emitting diodes (LEDs) or laser diodes to detect movement of the mouse relative to an underlying surface such as a mouse pad. The inertial/gyroscopic computer mouse uses a tuning fork or other accelerometer to detect rotary movement for every axis supported, most commonly using 2 degrees of rotational freedom and being insensitive to spatial translation. The user need only perform small wrist rotations to move a pointer or cursor on a display screen.

The underlying technology of modern surface-independent pointing/input devices such as optical mice (see FIGS. 1-2) is known as digital image correlation. The mouse includes a shell or housing 1 and a variety of input means such as left and right buttons 2, 3, a scroll wheel 4, etc. (see FIG. 1). A displacement detection LED 5 disposed on a bottom surface of the mouse (FIGS. 2-3) is used to detect movement of the mouse over a surface S (FIG. 3). An optical or optoelectronic mouse uses an optoelectronic sensor 6 (essentially, a tiny low-resolution video camera; see FIG. 3) to image a naturally occurring texture of a surface S made of materials such as wood, cloth, mouse pad materials and Formica, using light reflected from surface S via a focusing lens 7. These surfaces, when lit at a grazing angle by displacement detection LED 5 (see arrows in FIG. 3), cast distinct shadows that resemble a hilly terrain lit at sunset. Images of these surfaces are captured in continuous succession as the mouse is translated over the surface S, often at a speed of more than one thousand frames per second. Depending on the speed with which the mouse is moved, each image will be offset from the previous image by a fraction of a pixel or as many as several pixels. By using cross correlation to calculate how much each successive image is offset from the previous image, a displacement processor 8 can determine the distance the mouse has moved from image data captured by the sensor 6. The movement of the mouse can then be translated or converted into a corresponding movement of a visible marker such as a cursor on a graphical user interface such as a computer screen.

Even though a special surface S such as a mouse-pad is not needed by a modern optical mouse, a surface is still required for operation of the mouse. If a suitable operating surface S is not available and an alternative such as a touchpad or trackball is also not available, a conventional optical mouse cannot be used. In turn, certain tasks often done with pointing/input devices such as a computer mouse are difficult to impossible to accomplish with alternative pointing/input devices such as touchpads or trackballs. For example, use of drawing programs without a computer mouse can be difficult if not impossible. Likewise, tasks such as two-dimensional (2D) or 3D sculpturing or drawing, "flying" in multi-dimensional space (for example, three-dimensional space defined by X, Y, and Z axes) such as during gaming, etc. would be difficult to accomplish using a conventional touchpad, trackball, etc. For this reason, attempts have been made to adapt the familiar computer mouse to operate in the air or "on the fly," to avoid the need for a surface S over which to translate the mouse for operation.

Two conventional approaches exist for operating a mouse or other pointing/input device in the air, i.e. without translating over an underlying surface S: an active approach and a passive approach. The approach taken depends on whether the mouse has a displacement detection system that works in 3D space. The optical displacement detection system of an optical mouse (see FIG. 3) can only work on a surface S due to the operating mechanism summarized above; it cannot work if suspended in 3D space.

In the active approach, typically an imager such as an IR camera is integrated into the pointing device to detect lights from an IR emitter of a console such as the console of a gaming device, and calculate spatial coordinates for the pointing device accordingly. The Wii® Remote marketed by Nintendo® falls within that category. A problem with this approach is that the pointing device spatial coordinates can only be calculated when its imager has a direct line of sight to a sensor bar associated with the gaming device console.

For pointing devices that do not include a distance measuring component, a passive approach has been evaluated requiring a separate component to measure the distance between the pointing device and, for example, a gaming device or base station, or to identify the location of the pointing device with respect to the gaming device or base station. All gesture-based pointing device approaches, such the Kinect® device marketed by Microsoft®, belong to this latter category. In this case, the fingers or the hands of a user play the role of a pointing device and a special imaging device is required to identify the locations of the fingers or hands of the user. Three-dimensional mice such as 3Dconnexion/Logitech's® SpaceMouse® in the early 1990s and Kantek's® 3D RingMouse® in the late 1990s, also known as bats, flying mice or wands, also fall in this category. As an example, the RingMouse® was tracked by a base station through ultrasound. This approach has been found to provide insufficient resolution.

Still other attempts have been made using one-dimensional imaging devices to track a point light source, to recognize and execute gestures input by the operator. The problem with this approach is that a holding time is required before each operation such as a click or drag can be performed.

To date, the present inventors are unaware of any attempts to operate a conventional optoelectronic computer mouse in the air directly using a conventional imager such as a webcam as an imaging device to support 2D or 3D pointing on any type of display screen, 2D or 3D.

SUMMARY OF THE INVENTION

To solve the foregoing problems and address the identified need in the art, the present disclosure provides an input or pointing device which can be transitioned between conventional surface mode and an "air mode" not requiring a surface for operation. The system uses an imaging device and software to process light emitted from the pointing/input device and to determine therefrom a position of the pointing/input device. Systems and methods incorporating these devices are provided. In particular, the present disclosure provides systems and methods via which such "air mode" can be achieved using substantially conventional imaging devices such as webcams and substantially conventional pointing/input devices such as optoelectronic computer mice.

In one aspect, a human-computer interface system is provided including at least one pointing/input device and an imaging device operably connected to a computing device. The pointing/input device includes at least one visible point light source, which may emit a light beam having a wavelength defining a predetermined color. The at least one pointing/input device is held or moved in a three-dimensional space disposed within a field of view of the imaging device. The imaging device, which may be a conventional webcam, captures a plurality of sequential image frames each including a view of a position of the at least one point light source within the imaging device field of view. Then, from the captured plurality of sequential image frames, at least a position and a motion of the at least one point light source are calculated. A visual marker is then rendered on a graphical user interface, the visual marker corresponding to the position and/or the motion of the at least one point light source. The motion of the at least one point light source may further be mapped to a predetermined pointing and/or input command.

In another aspect, methods are provided for calculating a position of a visible point light source in a captured image including a view of the pointing/input device and mapping that visible point light source position to a corresponding visual marker position in a graphical user interface. In this manner, any pointing/input device including a point light source, including a conventional optoelectronic mouse, may be used for pointing and/or command input in a computing system without requiring a surface over which to translate the pointing/input device.

In yet another aspect, one or more computer program products are provided including executable instructions for calculating a position of a visible point light source in a captured image including a view of the pointing/input device and mapping that visible point light source position to a corresponding visual marker position in a graphical user interface. Digital data converted from acquired image frames are converted to digital data by an imaging device sensor, and analyzed as summarized above. The image frame digital data are analyzed to determine regions of increased color intensity corresponding to a position of the point light source in the image frame. The data may be subjected to one or more filtering steps to remove areas of lesser color intensity, and to remove areas displaying a color that is other than the predetermined color. Data representative of a location of the point light source are scaled in a non-linear fashion to render a visual marker such as a cursor on the graphical user interface, corresponding to a calculated position and/or motion of the at least one point light source moved in three-dimensional space.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims. Unless otherwise indicated, any patent and/or non-patent citations discussed herein are specifically incorporated by reference in their entirety into the present disclosure.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE INVENTION

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention. Also, it is to be understood that other embodiments may be utilized and that process, reagent, materials, software, and/or other changes may be made without departing from the scope of the present invention.

Figure 4:
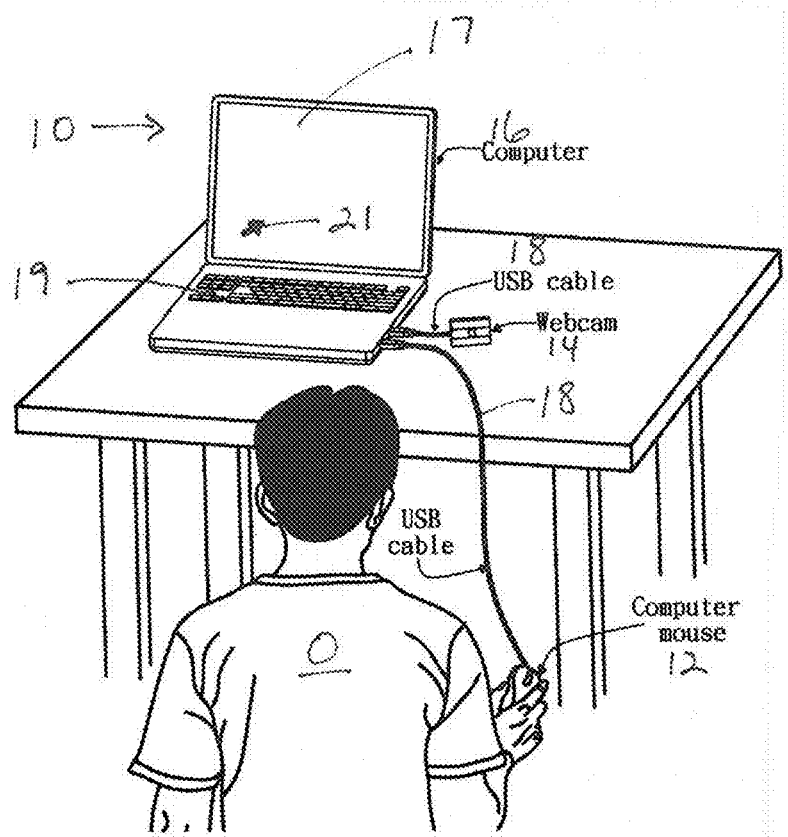
FIG. 4 depicts a human-computer interaction system using a stand-alone webcam as an imaging device, allowing the operation of the mouse of FIG. 1 without requiring a surface therefor.
Figure 5:
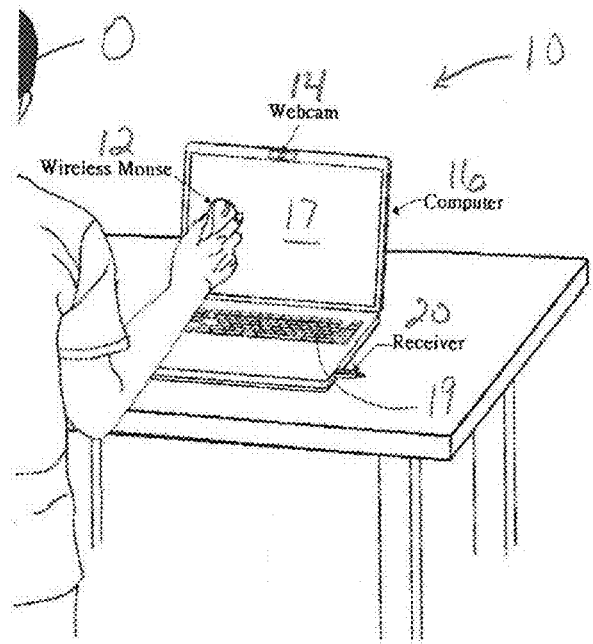
FIG. 5 depicts a human-computer interaction system using an embedded webcam as an imaging device that allows the operation of a wireless computer mouse without requiring a surface therefor.

The present disclosure relates to algorithms, software and a human-computer interaction system 10 that support the operation of a pointing/input device 12 such as an ordinary optical computer mouse in the air, i.e. without the requirement for translating over a surface to measure a distance displacement thereof. The system 10 comprises an imaging device 14 (such as a webcam), a pointing/input device 12 (as a non-limiting example, an optical computer mouse) and at least one light tracking computer program. The imaging device 14 and the pointing/input device 12 may be connected to a computing device 16 by wired means such as universal serial bus (USB) cables 18, or by wireless means such as a USB receiver 20 for a signal sent by a wireless pointing/input device 12 (see FIG. 5). The computing device 16 includes a graphical user interface 17, such as a conventional 2D or 3D screen, and an input means such as a keyboard 19. The imaging device 14 can be a separate peripheral for the computing device 16 (see FIG. 4) or can be embedded into an appropriate portion of the computing device 16 (see FIG. 5).

The imaging device 14 may be any suitable imaging device including single-view imaging devices or multi-view imaging devices including a digital video recorder operatively coupled to an image sensor which encodes images for later decoding by the computing device 16. Any suitable video recorder which is or can be configured for use with computing devices 16 is contemplated, such as a conventional webcam or other recorder or recorder configuration for providing digital data representative of captured image frames showing a particular view. However, for each captured image frame only one view of a taken scene will be used in the light tracking process even if a multi-view imaging device is used in the imaging process. A number of suitable image sensors are known in the art and are contemplated for inclusion in the present system 10, including without limitation conventional charge-coupled device (CCD) or complementary metal oxide semiconductor (CMOS) technology. The resolution of the imaging device 14 will typically be at least VGA level, i.e., 640×480.

In one exemplary embodiment, the imaging device 14 is installed as a component of or a peripheral to a keyboard or a computing device 16 such as a desktop computer. In yet another embodiment, the imaging device 14 is installed as a component of or a peripheral to a laptop or a notebook computer 15 (see FIGS. 4-5). Of course, the skilled artisan will appreciate that the system 10 can be integrated as a component of or provided as a peripheral for any known or to-be-developed computing device 16, including without limitation desktop or laptop computers, other portable computers, tablet computers, smartphones, personal digital assistants (PDAs), Web-enabled or so-called "smart" televisions, and the like.

Figure 1:
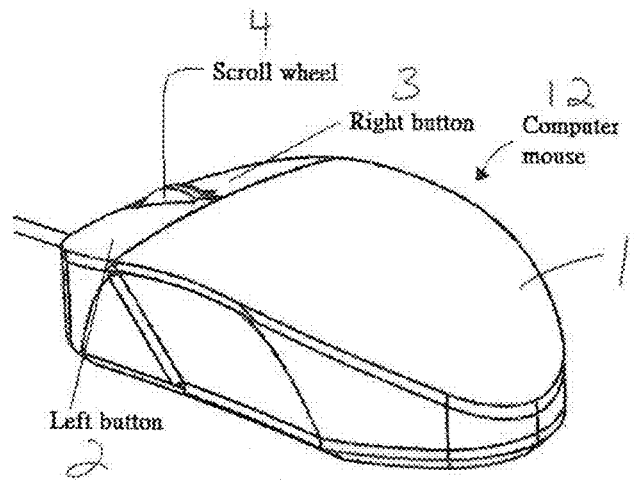
FIG. 1 shows an isometric view of a conventional optoelectronic mouse.
Figure 2:
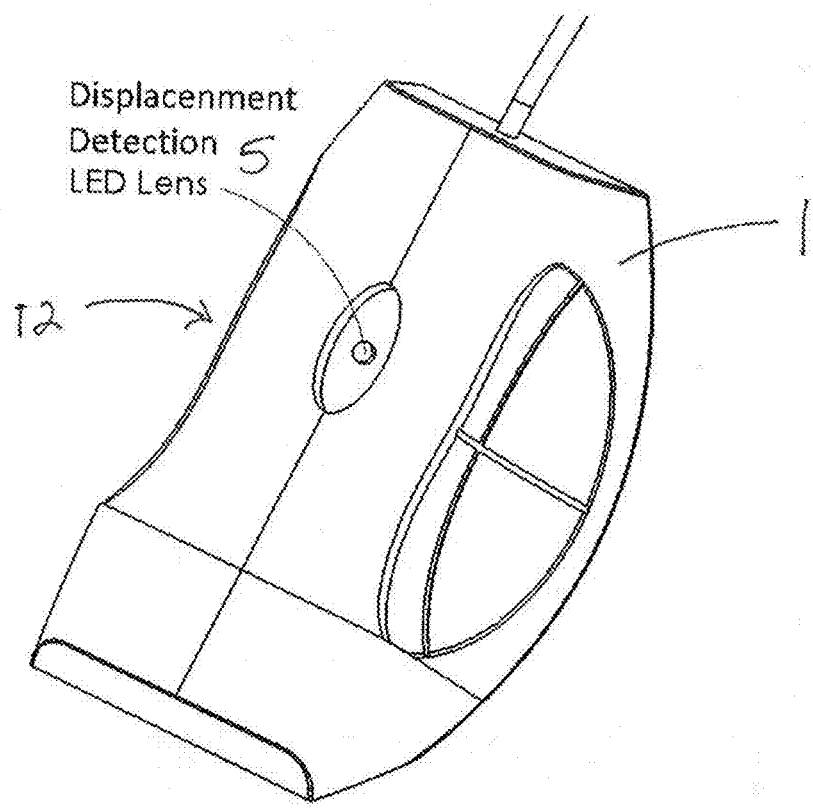
FIG. 2 shows a bottom view of the mouse of FIG. 1.
Figure 3:
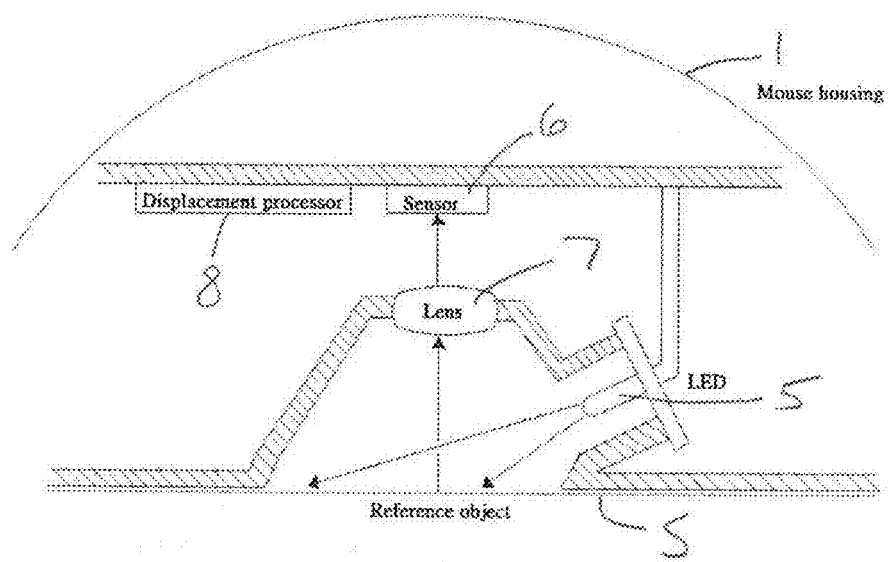
FIG. 3 shows the optical displacement detection system of the mouse of FIG. 1.
Figure 6:
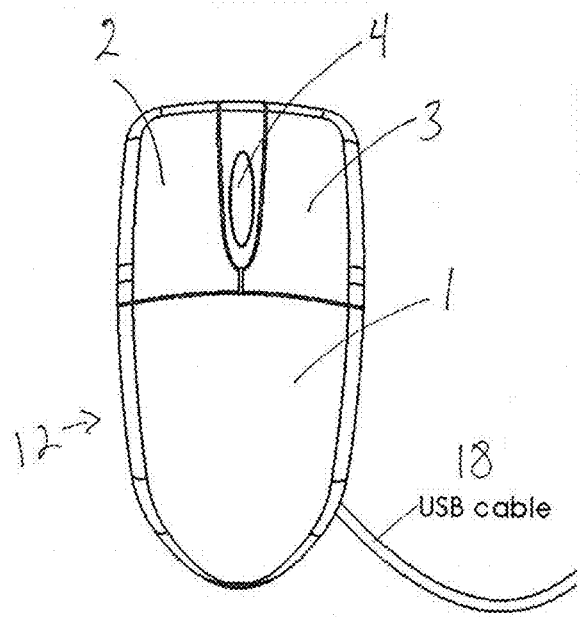
FIG. 6 shows a modification to the mouse of FIG. 1.
Figure 7:
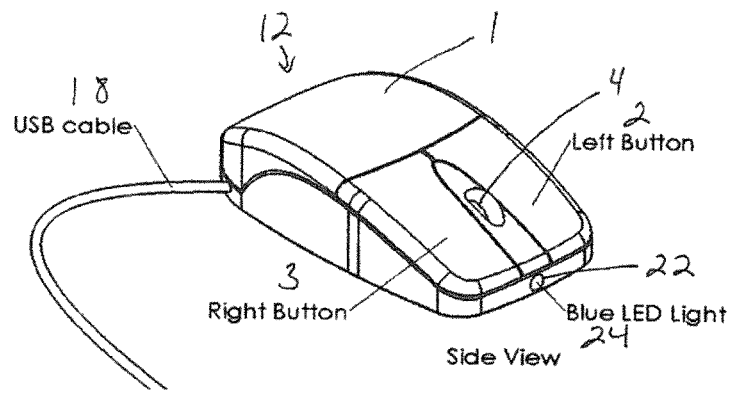
FIG. 7 shows a point light source installed in the mouse of FIG. 6.
Figure 8:
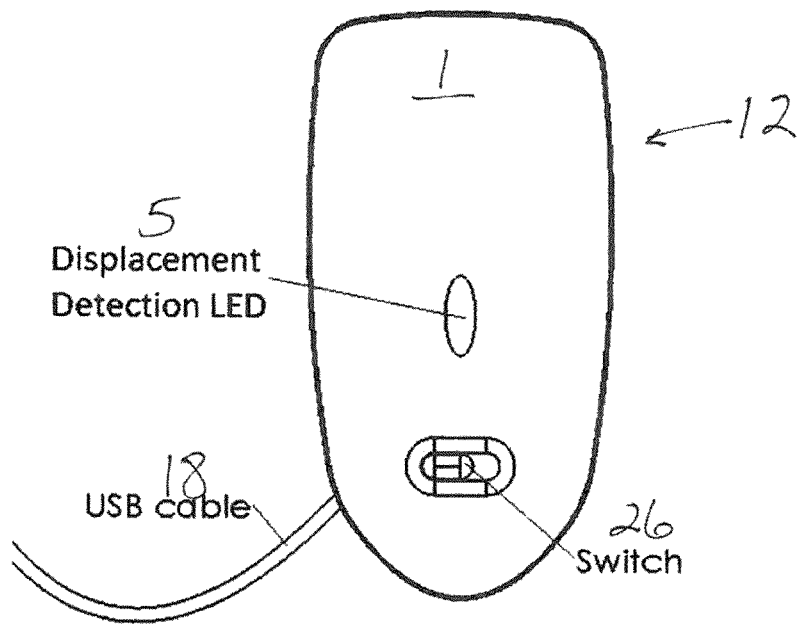
FIG. 8 shows an actuating switch for the point light source of FIG. 7.

In one embodiment, the pointing/input device 12 may be a conventional optoelectronic computer mouse, in which case the displacement detection light 5 that is conventionally a part of such devices (see FIGS. 2-3) is used as a point light source as will be described in more detail below. Alternatively, a separate point light source may be provided. For example, in another embodiment such as the wired optoelectronic computer mouse shown in FIGS. 6, 7 and 8, the USB cable 18 does not input into a front side of the computer mouse housing 1 as is typical, but instead inputs into an alternative portion of the housing 1 (FIG. 6). The aperture 22 typically reserved for the USB cable 18 is provided with a point light source 24 (FIG. 7). Any suitable point light source as further discussed below is contemplated. In one exemplary embodiment, an LED light is used. A switch 26 may be installed in an accessible portion of the housing 1, such as below the displacement detection light 5 on the bottom surface of the mouse (FIG. 8), to activate the point light source 24 in the embodiment of FIG. 7.

It will be appreciated that LED lights are only one non-limiting example of potential structures serving as point light source 24, and that other suitable light sources are contemplated for use. Likewise, it will be appreciated that a switch 26 is only one embodiment of a means for activating point light source 24. For example, it is contemplated to provide a pointing/input device 12 wherein the normal 2D scanning function is automatically disabled and wherein point light source 24 is activated when the pointing/input device 12 is lifted off of surface S and/or tilted by the operator O, such as to position the point light source 24 within a field of view of the imaging device 14 to allow pointing/input commands in a surface-free manner.

In any embodiment, the pointing/input device 12 may be used as a standard optoelectronic mouse in "surface mode," i.e. by translating over a surface S as is known. Any standard function of an optoelectronic mouse can be performed, such as moving a cursor around, making a single left click, single right click, double left click, dragging/moving an item, or scrolling a page up or down.

When it is desired to use the pointing/input device 12 in "air mode," i.e. without translating over a surface S, in the first embodiment the operator O activates the imaging device 14 and holds the pointing/input device 12 in his/her hand, with the displacement detection light 5 on the bottom surface of the pointing/input device 12 facing the imaging device 14. In the second embodiment, to use the pointing/input device 12 in "air mode" the pointing/input device 12 switch 26 is actuated to activate point light source 24. In either embodiment, the operator O holds the pointing/input device 12 whereby the point light source 24 is held within a vertical and horizontal field of view of the imaging device 14 (see FIGS. 4 and 5). As will be described below, the operator O can now perform a variety of operations, such as 2D pointing by moving the pointing/input device 12 in 3D space.

The operator O can move the pointing/input device 12 in any direction as long as the point light source 24 of the pointing/input device 12 is disposed within the horizontal and vertical fields of view of the imaging device 14 and viewed by the imaging device 14. In turn, all standard functions of the optoelectronic mouse in "surface mode" are performed using the same mouse buttons, etc. while in "air mode." That is, the operator O may click the left or right mouse button 2, 3 or scroll the middle wheel 4 to perform all the familiar functions performed in the surface mode (moving a cursor around, making a single left click, single right click, double left click, dragging/moving an item, or scrolling a page up or down, etc.) in air mode, except the location of the cursor 21 on the computing device 16 graphical user interface 17 (see FIG. 4) is no longer measured by the displacement detection system of the pointing/input device 12. Instead, the cursor displacement, location, etc. are detected by the imaging device 14 and the light tracking computer program of the interaction system 10 as will be described below.

As is well known, a pointing/input device 12 is graphically represented on a graphical user interface 17 by a visible marker 21, such as a cursor, an arrow, or some other icon. When the pointing/input device 12 is held up in the air by the operator O with the point light source 24 held in a field of view of the activated imaging device 14 (see FIG. 4 or 5), the standard displacement detection system of the pointing/input device 12 is disabled. The point light source 24 of the pointing/input device 12 is activated (see FIGS. 2 and 7), or alternatively the displacement detection light 5 of the pointing/input device 12 is used as the point light source 24. While in air mode, the location of the cursor or other icon is determined by at least one light tracking computer program by processing irregular halos generated by the point light source 24 of the pointing/input device 12 in the images taken by the imaging device 14. As will be described in greater detail below, captured images containing such point light source 24 halos may be used as reference points indicating a location of the pointing/input device 12 in a 2D world coordinate system. These reference points may then be processed to render a corresponding location of the visible marker 21 on graphical user interface 17.

Figure 9:
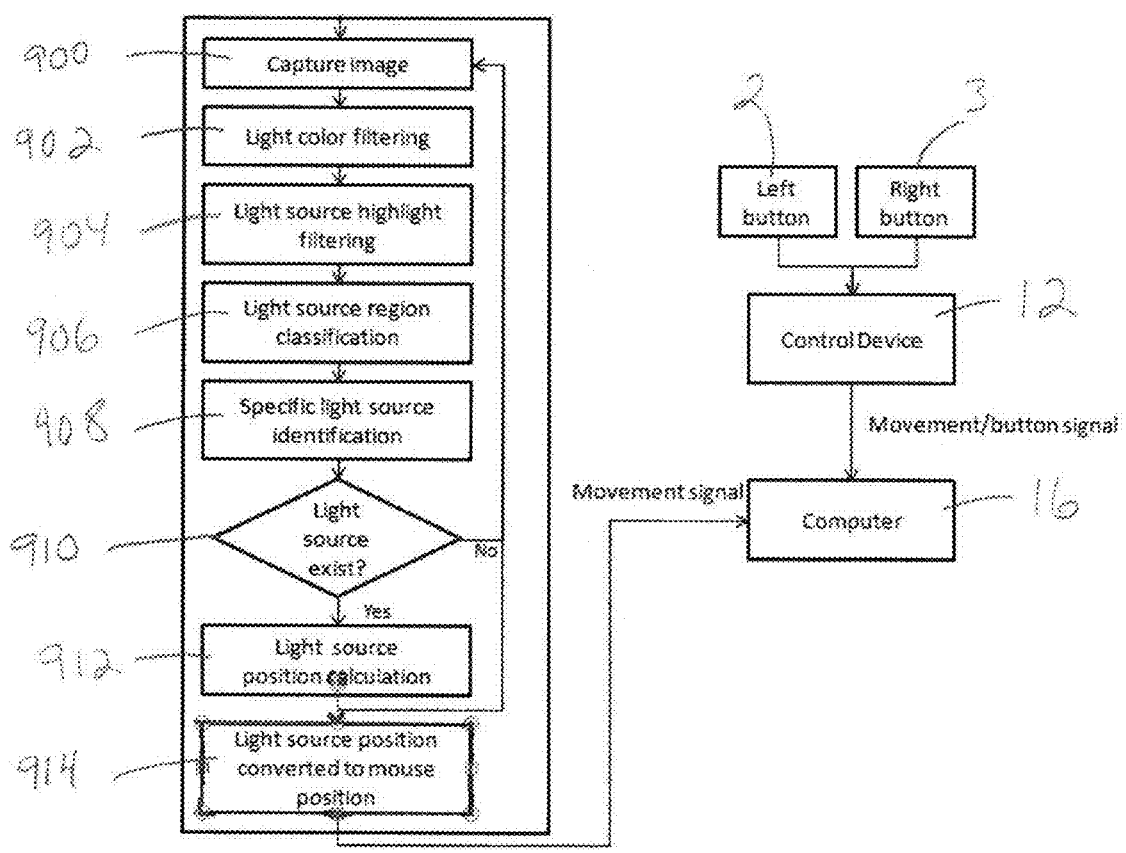
FIG. 9 is a flow chart depicting a process for tracking a point light source in a captured image.

A process according to the present disclosure for tracking the halos of the point light source 24 of the pointing/input device 12 and rendering a corresponding location of the visible marker 21 on graphical user interface 17 is shown at a high level in FIG. 9. The light tracking computer program (LTCP) receives digital data converted from image frames captured by the imaging device (step 900) through the operating system. The skilled artisan will appreciate that if the resolution of each captured image frame is 640×480, the images are usually input in the YUV color format with Y channel standing for intensity, U channel standing for blue light, and V channel standing for red light. If the resolution of each image is higher than 640×480, the images are usually encoded in motion jpg format which after decoding becomes the YCbCr color format with Y channel standing for intensity, Cb channel standing for blue light and Cr channel standing for red light. Typically, point light sources 24 emitting one of a red or a blue color are selected, since the light wavelengths for red (450-495 nm) and blue (620-750 nm) are at nearly opposite ends of the visible light spectrum (380-750 nm).

However, use of other colors is contemplated, and the skilled artisan can readily derive the corresponding wavelengths of the visible spectrum corresponding to alternative colors. For example, a green point light source 24 could be provided when an RGB (red-green-blue) color model is used. In such an instance, image frames would be converted into an HSV (hue, saturation, and value) color model, i.e. a cylindrical-coordinate representation of the RGB color model, and an intensity of the new color in the image could be computed.

Figures 10A, 10B, 10C:
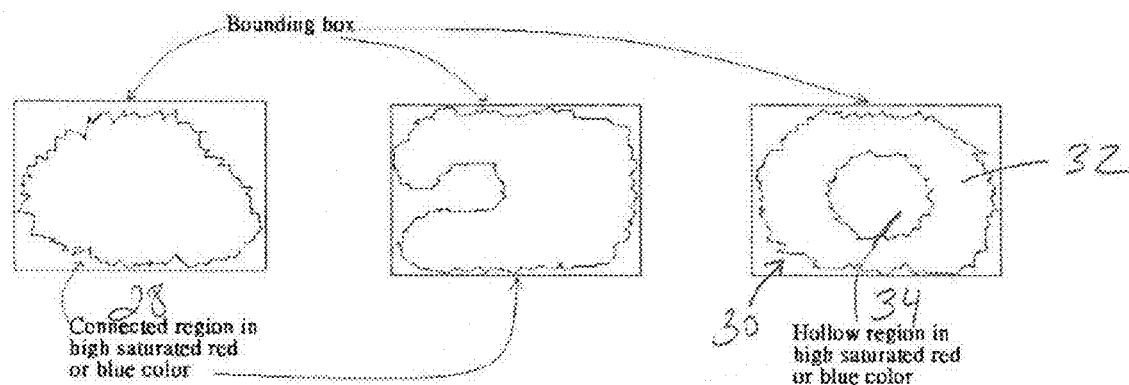
FIGS. 10a, 10b, and 10c depict characterization of connected (FIGS. 10a and 10b) and hollow (FIG. 10c) light regions in a captured image.

Next (FIG. 9, step 902), the color feature of point light source 24 is used to identify possible candidates of the point light source 24 location in each captured image frame. The LTCP examines each image frame to identify regions with higher saturated color corresponding to the point light source 24 color. For example, for a point light source 24 emitting a red or blue color, this would be U or V channel or Cb or Cr channel, respectively, depending on image resolution as explained above. The identified region could be a connected region 28 or a hollow or "halo" region 30 (see FIGS. 10a, b, c) depending on if the region represents a light source or a lit object. For instance, a region corresponding to a red box (not shown) in the background would display as a connected region 28 while a region corresponding to a red point light source 24 of the pointing/input device 12 would display as a halo region 30. This is because while the surrounding area 32 of the halo region 30 would be red, the center part 34 of the halo region 30 would either be white or close to white due to the very high intensity of the light there.

Step 902 is done in two phases: first, filtering out pixels where the color value is relatively low; second, filtering out pixels where the difference between the red channel and the blue channel is relatively small. The first phase is to retain only those pixels with higher saturated color and the second phase is to retain only those pixels where the higher saturated color is either blue or red depending on the color of the point light source 24. A representative algorithm for accomplishing these two phases follows below. It will be appreciated that these two phases can be implemented in a single loop. However, for ease of understanding the phases are presented below in two separate loops to make the process easy to follow. The representative algorithm presented below is for the YCbCr color model. If the YUV color model is used, the skilled artisan will understand that it is necessary to simply replace Cb with U and Cr with V.

---

Step 902: Light color filtering:

Def:  RC = Red channel;   BC = Blue channel;   Sat_Threshold = 55;
      Diff_Threshold = 75;
for (each pixel of the input image) do {   //Phase 1
    RC = MAX((Cr – 128), 0 ) + MAX((Inverse(Cb )– 128), 0);
    BC = MAX((Cb – 128), 0) + MAX((Inverse(Cr) – 128), 0);
    SatRef = Abs(Cb–128) + Abs(Cr–128);
    If (Sat_Ref < Sat_Threshold) {
        RC = 0;   BC = 0;
    }
}
for (each pixel of the input image) do {   // Phase 2
    CbCrDiff = MAX(Cb, Cr) – MIN(Cb, Cr);
    If (CbCrDiff < Diff_Threshold) {
        RC = 0; BC = 0;
    }
}

---

In Phase 1 of the above algorithm, Inverse(Cb) stands for the inverse of Cb with respect to 255, i.e., Inverse(Cb)=255–Cb. Inverse(Cr) is defined similarly. The values assigned to Sat_Threshold (55) and Diff_Threshold (75) are empirical, they generate the best results in most of the cases.

Figure 11:
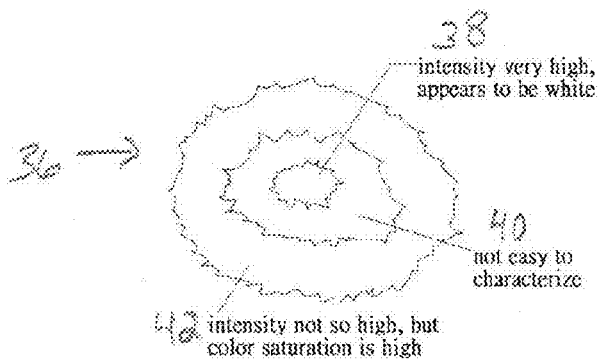
FIG. 11 depicts characterization of pixels in light regions in a captured image.

Next (FIG. 9, step 904) is to identify pixels in a light source region 36. A light source region 36 can be divided into three layers according to color intensity (see FIG. 11). Pixels in the center layer 38 have very high intensity and appear to be white. Pixels in the middle layer 40 have high intensity but retain some color component. Pixels in the outer layer 42 have a lesser intensity, but have high color saturation. Pixels in the middle layer 40 are not so easy to characterize since color saturation in this layer varies from very low to high, but pixels in the center layer 38 and the outer layer 42 are relatively easy to characterize. For this reason, only pixels in the center layer 38 and the outer layer 42 are identified. Pixels in these layers are referred to as highlight pixels and colored highlight pixels, respectively.

A pixel is considered a highlight pixel if the intensity (Y-channel) of the pixel is high enough to be greater than a highlight threshold value (HL_Threshold) and the color saturation is low enough to be less than a highlight saturation threshold value (HL_Sat_Threshold). A pixel is considered a colored highlight pixel if intensity of the pixel is high enough to be greater than a colored highlight threshold value (Color_HL_Threshold) that is less than the highlight threshold value (HL_Threshold) and the color saturation is high enough to be greater than a colored highlight saturation threshold value (Color_HL_Sat_Threshold).

The values of HL_Threshold, HL_Sat_Threshold, Color_HL_Threshold and Color_HL_Sat_Threshold are arbitrarily set to 200, 5, 150 and 150, respectively, for a first filtering pass. The colored highlight pixel filtering process will typically be performed only once. However, if no highlight pixels are identified during the first highlight pixel filtering process, the value of HL_Threshold is decreased by 5 and the filtering process is repeated. This process can be repeated as many as 10 times to ensure the spectrum above the Color_HL_Threshold value can be entirely scanned if necessary. If no highlight pixels are identified after the 10$^{th}$ filtering process and no colored highlight pixels are identified either, the LTCP concludes that this image has no highlights. A representative algorithm for this step is shown below.

```
Step 904: Light source highlight filtering:

Def: Init_Threshold = 200;   Max_DecreaseTimes = 10;   DecreaseTime = 0;
    HL_Sat_Threshold = 5;
    Y = intensity channel;
    SatRef = Saturate reference channel;    // SatRef = Abs(Cb-128)+Abs(Cr-128)
    HC = Highlight channel;
    CHC = Colored Highlight channel;
    Color_HL_Threshold = 150;
    Color_HL_Sat_Threshold = 150;
    bHighlightFound = false;
// Identify colored highlight pixels
for (each pixel P of the input image) do
    If (Y[P] > Color_HL_Threshold   &&   SatRef[P] > Color_HL_Sat_Threshold)
        CHC[P] = Y[P];
// Identify highlight pixels
while ( bHighlightFound == false   &&   DecreaseTime < Max_DecreaseTimes)
{
    HL_Threshold = Init_Threshold - DecreaseTime*5;
    for each pixel P in the image
    {
        if (Y[P] > HL_Threshold   &&   SatRef[P] < HL_Sat_Threshold)
        {
            HC[P] = Y[P];
            bHighlightFound = true;
        }
    } // end of for-loop iR
    DecreaseTime++ ;
} // end of while-loop
```

A fourth step (step 906) implements four tasks to ensure the light source region 36 is properly classified. The first task is to remove excessive pixels in a halo region 30 (see FIG. 10c) identified in step 902 if the size of the halo region 30 exceeds a pre-determined value (Filter_Pixel_Threshold=10000). If such a situation occurs, only pixels in the top 20% of the spectrum are retained. This is to ensure the removed pixels are those in the outskirt of the halo region 30, not the ones close to the center 34 of the halo region 30. A representative algorithm for doing this task is shown below.

```
Step 906: Light source region classification; Task 1, remove excessive
                    pixels in halo region 30:

Def: Filter_Pixel_Threshold = 10000;   // 100x100 block
     Level[ ];      //Collect pixels with the same value (0 to 255)
// Sort and count non-zero pixels in the red channel RC
for (each pixel P in image RC) do
{
    If (RC[P] > 0)
    {
        Pixel_Value = RC[P];
        Level[Pixel_Value] ++;
        Total_Pixel_Count++;
    }
}
// Only keep pixels within the top 20% of the spectrum
if (Total_Pixel_Count > Filter_Pixel_Threshold)
{
    Reserve_Pixel_Count_Threshold = 0.2*Total_Pixel_Count;
    Accu_Pixel_Count = 0;
    // Prior_Valid_Pixel_Value = 0;
    // bFirst_Valid_Level = true;
    for (Pixel_Value = 255 to 0) do
    {
        if (Level[Pixel_Value] == 0)
            continue;
        // if (bFirst_Valid_Level == true ) {
```

Step 906: Light source region classification; Task 1, remove excessive pixels in halo region 30:

```
//      Prior_Valid_Pixel_Value = Pixel_Value;
//      bFirst_Valid_Level = false;
// }
    Accu_Pixel_Count += Level[Pixel_Value];
    if (Accu_Pixel_Count > Reserve_Pixel_Count_Threshold)
    {
        Reserve_Level = Pixel_Value;
        Break;
    }
    // Prior_Valid_Pixel_Value = Pixel_Value;
}
// Remove excessive pixels
for (each pixel P in image RC) do
    if (RC[P] < Reserve_Level)
        RC[P] = 0;
}
```

For each row of the image, the second task is to collect and organize pixels that fall in a halo region 30 into segments so that adjacent segments can then be merged to form candidate light source regions for analysis in the next task. The formed segments are referred to as light segments (LSeg; see FIG. 12). Theoretically, the pixels in a light segment should be in consecutive order. However, in reality, there might be broken points due to the fact that the light sources are not perfect point light sources. Those broken points usually are quite short though, only a few pixels long. So, when two sets of consecutive pixels are just a few pixels apart (<=SegGap_Threshold=5), they can safely be considered to be in the same segment. An algorithm for this task is shown below.

Step 906: Light source region classification; Task 2, generate light segments for RC or BC:

```
Def: SegGap_Threshold = 5;   // Broken point tolerance value
    LS [ ];      // Collection of light segments
    SegCount = 0;
bSegStart = false;
for (each row iR of the image) do
{
    for (each pixel iC) do
    {
        if (Pixel_Value > 0)
        {
            CandidateSegEnd = iC;
            if (bSegStart == false)
            {
                SegStartPos = iC;
                bSegStart = true;
            }
        }
        else if (bSegStart==true && (iC -
            CandidateSegEnd)>SegGap_Threshold)
        {
            SegCount++;
            LS[SegCount].Row = iR;
            LS[SegCount].Start = SegStartPos;
            LS[SegCount].End = CandidateSegEnd;
            LS[SegCount].SegID = SegCount;
            bSegStart = false;
        }
    }
    // if the segment reaches the right side boundary
    If ((iC is the last pixel in iR) && (bSegStart == true))
    {
        SegCount++;
        LS[SegCount].Row = iR;
        LS[SegCount].Start = SegStartPos;
        LS[SegCount].End = CandidateSegEnd;
        LS[SegCount].SetID = SegCount;
```

Step 906: Light source region classification; Task 2, generate light segments for RC or BC:

```
        bSegStart = false;
    }
}
```

Figure 12:
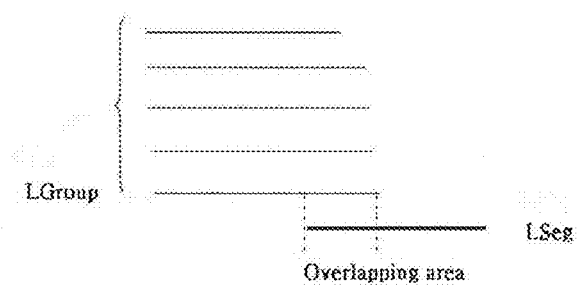
FIG. 12 depicts overlapping of a light segment and a light group.

The third task is to merge vertically adjacent light segments (LSeg) into light groups (LGroup) (see FIG. 12). Here, light segments LSeg from the light segment set LS[ ] are iteratively taken to form new light groups or to merge with existing light groups. If the light segment LSeg taken from LS [ ] is the first light segment in LS [ ], a new light group LGroup with one light segment (LSeg) is formed and the following parameters are set: the total size of LGroup is the size of LSeg, the first light segment of LGroup is LSeg, the start point of LGroup's last light segment is the start point of LSeg, the end point of LGroup's last light segment is the end point of LSeg, and the next row for LGroup to perform an overlapping test with other light segments is the row below LSeg. LGroup is also assigned an ID so that a reference to this light group can be quickly established. LSeg keeps a copy of LGroup's ID as well so that one can easily tell which light group LSeg is a part of.

If the light segment LSeg taken from LS[ ] is not the first light segment in LS[ ], we compare it with all existing light groups to see if it should be merged with any of the existing light groups or if a new light group should be formed. If a light group LGroup taken from a light group set LG[ ] overlaps with a light segment LSeg (see FIG. 12) and this is the first such an event to LSeg (see FIG. 13), then LSeg is merged with LGroup as a last segment and the parameters of LGroup are updated. These include setting the start point and end point of LSeg as the start point and end point of LGroup's last segment, respectively, adding the size of LSeg to the total size of LGroup, and setting the row below LSeg as the next row for LGroup to perform an overlapping test with other light segments. As before, LSeg will keep a copy of LGroup's ID in a field called GroupID, so one can tell that LSeg is a part of LGroup. The LTCP will also remember LGroup as the last light group merged with LSeg.

Figure 13:
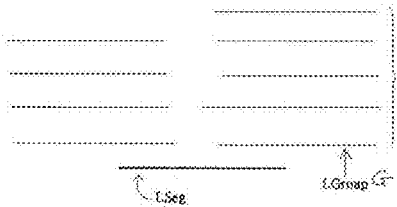
FIG. 13 depicts overlapping of a light segment with more than one identified light group.
Figure 14:
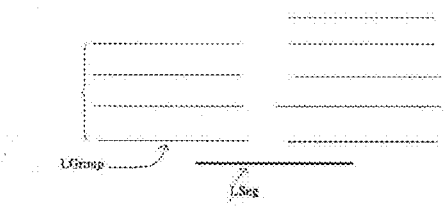
FIG. 14 depicts overlapping of a light segment with more than one identified light group.

If the light group LGroup taken from LG[ ] overlaps with light segment LSeg but this is not the first such an event to LSeg (FIG. 14), i.e., LSeg has already been merged with another light group G such as the one on the right hand side of FIG. 13, then LGroup will be merged with the light group G. This is done by adding the total size of LGroup to the total size of G and change the GroupID of each segment in LGroup to G.

Figure 16:
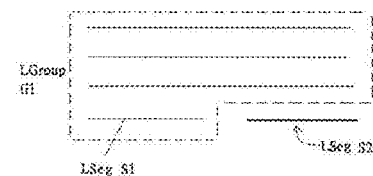
FIG. 16 shows a light segment that does not overlap with a light group.
Figure 17:
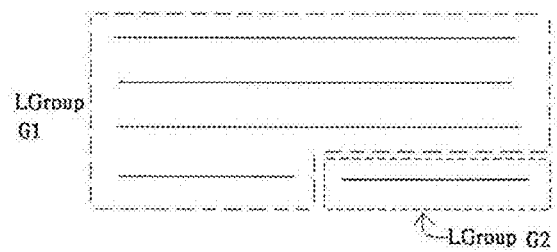
FIG. 17 shows a new light group formed using the light segment of FIG. 16.

If an LSeg S2 does not overlap with any existing light groups in LG[ ] (see LGroup G1 and LSeg S2 in FIG. 16), then a new light group with LSeg S2 as its first and also the last segment is formed (FIG. 17). The work to be done here is exactly the same as the case when LSeg is the first segment of LS[ ]. The task is finished when all segments in LS[ ] are processed. A representative algorithm for this task is shown below.

Step 906: Light source region classification; Task 3, merge vertically adjacent light segments into groups:

```
Def: LG[ ];    // Collection of light segment groups
    GroupCount = 0;
InitGroupInfo(LGroup, LSeg)
{
```

Step 906: Light source region classification; Task 3, merge vertically adjacent light segments into groups:

```
    LGroup.HeadSegID = LSeg.SegID;
    LGroup.SegStart = LSeg.Start;
    LGroup.SegEnd = LSeg.End;
    LGroup.NextRowForCompare = LSeg.Row + 1;
    LGroup.Size += LSeg.End - Lseg.Start;
}
for (each segment LSeg in LS[ ]) do
{
    if (LSeg is the first Light Segment in LS[ ])
    {
        GroupCount++;
        LGroup = new LG;
        InitGroupInfo(LGroup, LSeg);
        LGroup.GroupID = GroupCount;
        LSeg.GroupID = GroupCount;
    }
    else {
        for (each light group LGroup in LG[ ]) do
        {
            if (LSeg and LGroup overlap)
            {
                if (LGroup is the first one compared with LSeg)
                {
                    LGroup.NextRowForCompare = LSeg.Row + 1;
                    LGroup.SegStart = LSeg.Start;
                    LGroup.SegEnd = LSeg.End;
                    LGroup.Size += LSeg.End - LSeg.Start;
                    LSeg.GroupID = LGroup.GroupID;
                    LastMatchID = LGroup.GroupID;
                }
                else {
                    GroupID = LGroup.GroupID;
                    LG[LastMatchID].Size += LGroup.Size;
                    for (LS[ ] with index iLS from 0 to
                    LSeg.SegID) do
                        if (LS[iLS].GroupID == GroupID)
                            LS[iLS].GroupID = LastMatchID;
                    Reset information in LG[GroupID] to zero;
                }
            }
        }
        if (LSeg does not overlap with any existing light group in LG[ ])
        {
            GroupCount++;
            LGroup = new LG;
            InitGroupInfo(LGroup, LSeg);
            LGroup.GroupID = GroupCount;
            LSeg.GroupID = GroupCount;
        }
    }
}
```

Figure 15:
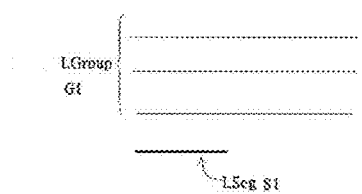
FIG. 15 depicts overlapping of a light segment and a previously identified light group.
Figure 18:
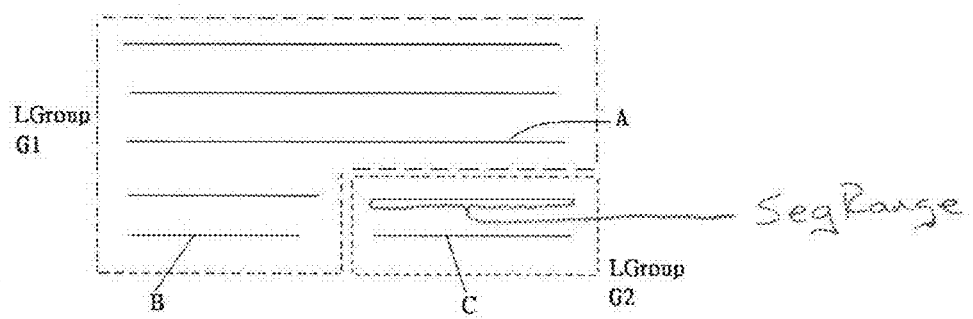
FIG. 18 shows new light groups defined with new light segments.

The fourth and final task of step 906 is to merge connected groups, such as LGroup G1 and LGroup G2 in FIG. 18. FIG. 15 provides an illustrative example of the need for this step. As shown, the light segment LSeg S1 overlaps with the existing light group LGroup G1, hence, LSeg S1 is merged into LGroup G1 as the last segment of LGroup G1. When a new light segment LSeg S2 is encountered (see FIG. 16), since LGroup G1 does not overlap with LSeg S2 (because the last segment LSeg S1 of LGroup G1 does not overlap with LSeg S2), a new light group LGroup G2 is formed (see FIG. 17). FIG. 18 shows the situation that each of LGroup G1 and LGroup G2 gets a new segment member subsequently (B and C, respectively). Hence, two light groups could be connected to each other and yet each of them maintains a separate light group status. The merging process is performed in a backward order, i.e., light groups formed more recently are processed first.

As an example, for a light group LGroup G2, in LG[ ] (FIGS. 17-18), to detect if a situation shown in FIG. 18 exists, the first light segment and also the start point and end point of the first light segment are identified. Let the range defined by the start point and end point of the first light segment of LGroup G2 be called SegRange. We then check if there is a light segment that lies on the row immediately before the first light segment of LGroup G2 and overlaps with the region SegRange. If such a light segment exists (see light segment A in FIG. 18), we identify the light group LGroup G1 that light segment A belongs to and merge LGroup G2 with this light group LGroup G1. If the situation in FIG. 18 is considered, this means that the size of LGroup G2 will be added to the total size of LGroup G1 and the groupID of all the light segments of LGroup G2 will be set to LGroup G1. A representative algorithm for this task is shown below.

Step 906: Light source region classification; Task 4a, merge connected groups:

```
for (LG[ ] with index iLG from GroupCount to 1) do
{
    Current_GroupID_For_Merge = LG[iLG].GroupID;
    GroupHeadSegID = LG[iLG].HeadSegID;
    // Set overlapping condition
    SegRangeStart = LS[GroupHeadSegID].Start;
    SegRangeEnd = LS[GroupHeadSegID].End;
    PriorRowForComapre = LS[GroupHeadSegID].Row-1;
    SegID_ForCheck = LS[GroupHeadSegID].SegID - 1;
    while (SegID_ForCheck>0&&LS[SegID_ForCheck].Row>=
    PriorRowForCompare)
    {
        LSeg = LS[SegID_ForCheck];
        if (LSeg matches overlapping condition)
        {
            GroupID = LSeg.GroupID;
            LG[GroupID].Size +=
            LG[Current_GroupID_For_Merge].Size;
            // Set GroupID of light segments in LS[ ] with
            // Current_GroupID_For_Merge as GroupID to GroupID
            for (LS[ ] with index iLS from 0 to LSeg.SegID) do
                if (LS[iLS].GroupID =
                Current_GroupID_For_Merge)
                    LS[iLS].GroupID = GroupID;
            Reset information in LG[GroupID] to zero;
        }
        SegID_ForCheck--;
    }
}
```

Figures 19A, 19B:
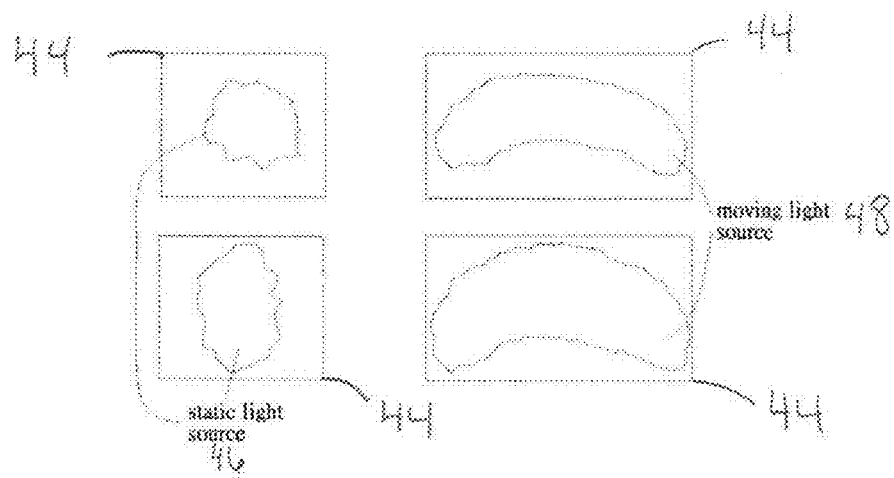
FIGS. 19a and 19b depict small and close proximity regions representing static status (FIG. 19a) and moving status (FIG. 19b) of a point light source.

Once all connected light groups are merged, the resulting light groups are sorted by size and the largest three light groups are selected. For each of these three light groups, a bounding box 44 is determined (FIG. 19), and each light group is tested to determine if each of them indeed contains highlight pixels and/or colored highlight pixels. Typically, if operator O is using only one pointing/input device 12, the largest identified light group would be the light source region corresponding to the point light source 24 and this portion of the analysis could be terminated. However, it is contemplated that an operator O might be using more than one pointing/input device 12, and so the three largest light groups are selected. An algorithm for this part is shown below.

Step 906: Light source region classification; Task 4b, merge connected groups:

```
Def: SizeOrderIndex[ ] = Sort(Light group indices by size);
    Region[ ];    // for storage of light group bonding boxes
    RegionCount = 0;    // for valid region count
    ValidRegionGroupID[3];    // for storage of qualified GroupID
for (i=0 to 3) do
```

Step 906: Light source region classification; Task 4b, merge connected groups:

```
{
    GroupID = SizeOrderIndex[i];
    if (LG[GroupID].Size == 0)
        Break;          // exit loop
    for (each light segment LSeg in LS[ ]) do
    {
        if (LSeg.GroupID == GroupID)
        {
            Region;
            Region;
            Region;
            Region;
        }
    }
    for (each pixel P in image Region[i]) do
    {
        if (HC[P] > 0   || CHC[P]>0)
        {
            RegionCount++;
            ValidRegionGroupID[RegionCount] = GroupID;
            Break;
        }
    }
}
```

Next (FIG. 9, step 908) is to find the most appropriate light group in the three regions identified in step 906 so that the best location of the light source can be computed. This step first merges small and close proximity regions into bigger regions. This is because in the captured image the point light source 24 of the pointing/input device 12 is actually a set of two separate but close proximity light groups 46, 48. Therefore in the case that the light groups are covered by separate but close proximity regions, the regions should be combined to make subsequent processing simpler. The criterion used here is, if two regions are both small enough in width or height (widths are both smaller than 30 pixels or heights are both smaller than 30 pixels) and they are close enough to each other (at most 5 pixels apart), then these two regions are merged into a single region. This criterion ensures that the static light source 46 status (FIG. 19a) and the moving light source 48 status (FIG. 19b) of the light source are both covered. A function for this task called MergeSmallAndCloseRegions( ) is included in the following code segment. After this work, the three regions passed over by step 906 may become two regions or just one region. The new region set will be referred to as the new list of regions.

One or more light groups are then found for each region in the new region list. If A is a region in the new region list, we take the regions that correspond to A in the RC channel, the CbCrDiff channel and the Y channel, respectively, and use these data to find the initial position of the light source.

The function doing this work is called InitPos( ) and is given in the following code segment. InitPos( ) uses RC channel as a mask to determine which CbCrDiff channel values should be recorded. Recall that the higher the CbCrDiff channel value, the closer to red or blue the color. The initial location of the light source is computed by taking 20% of the pixels in A with the highest CbCrDiff values and computing averages of their row and column indices.

Figure 20:
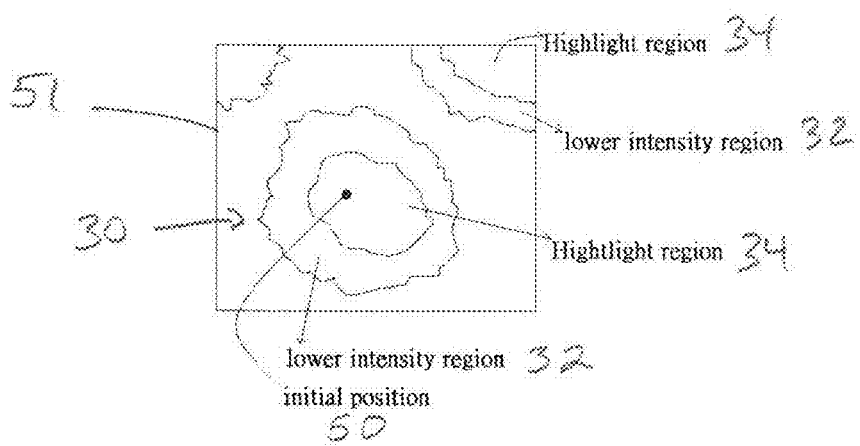
FIG. 20 depicts an initial position of a point light source within a selected light group.
Figure 21:
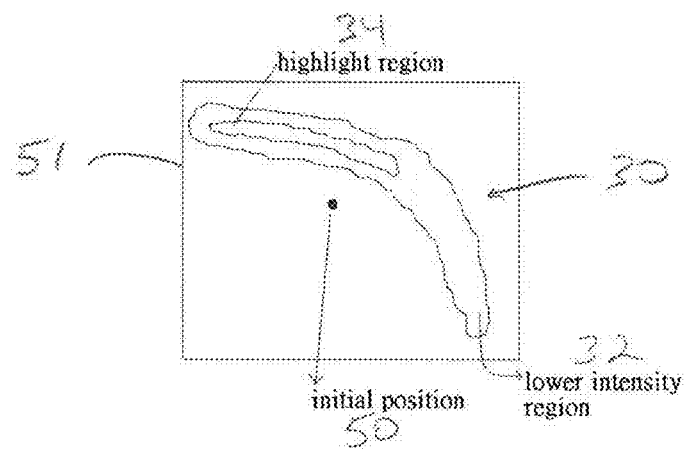
FIG. 21 depicts an initial position of a point light source outside a selected light group.

Next is to identify the light group that contains the initial position 50 of the point light source 24 in a selected captured image 51. For a static point light source 24 or a point light source 24 moving at a relatively low speed, the computed initial position 50 would be inside a light group 30 (see FIG. 20). But when the light source is moving in a relatively fast speed in a curved path, the initial position 50 could be outside a light group (see FIG. 21). In such a case, we find a light group 30 that is closest to the initial position 50 of the point light source 24.

To identify the light group 30 that contains the initial position 50 of the point light source 24 in image 51, we first select a brighter area of the Y channel (intensity >=200) and find its light segments and light groups using the algorithms introduced respectively in task 2 and task 3 of FIG. 9, step 906. The reason for only considering pixels with intensity value >=200 is to ensure we have a tighter bound for the highlight area of the light source. For simplicity, in the following code, we use FilterLightSegment( ) to represent the process of finding the light segments in the brighter area of the Y channel and use GroupingLightSegment( ) to represent the process of merging the light segments into light groups, using the techniques introduced in Step 906. If one of the above light segments contains the initial position of the point light source 24 then the light group 30 that contains this light segment is what we are looking for.

If none of the light segments contains the initial position of the point light source 24, then we go through the light segments to find the ones that are close enough to the initial position 50 of the point light source 24. A light segment is said to be close enough to the initial position 50 of the point light source 24 if the distance between the light segment and the initial position of the point light source 24 is smaller than 50 pixels. The distance between a light segment and the initial position 50 of the point light source 24 is the minimum of the distances between the initial position 50 of the point light source 24 and the points of the light segment. With all the light segments that are close enough to the initial position 50 of the point light source 24, we find the light groups that contain these light segments and return the one with the largest size (area). If there are no light segments close enough to the initial position 50 of the point light source 24, the light group that contains the closest light segment to the initial position 50 of the point light source 24 is returned.

Step 908: Specific light source identification:

```
MergeSmallAndCloseRegions(Region[ ], RegionCount);
// Three regions may become two regions
for (candidate region A in Region[ ]) do
{
    PatternWidth = A.Right - A.Left;
    PatternHeight = A.Bottom - A.Top;
    if (PatternWidth == 0 || PatternHeight == 0 )
        Continue;
    RC_Pattern = Region A of RC;       // for red light
    CbCrDiff_Pattern = Region A of CbCrDiff;
    Y_Pattern = Region A of Y;
    (X, Y) = InitPos(PatternWidth, PatternHeight, RC_Pattern, CbCrDiff_Pattern);
```

| Step 908: Specific light source identification: |
|---|

```
for (each pixel P in Y_Pattern) do
{
    If (Y_Pattern[P] < 200)
        Y_Pattern[P] = 0;
}
    PTN_LS[ ] = FilterLightSegment(Y_Pattern);    // Refer to task 2 of Step 4
    PTN_LG[ ] = GroupingLightSegment(PTN_LS[ ]);   // Refer to task 3 of Step 4
    LS_Count = Segment count of PTN_LS[ ];
    OverlapGroupFound = false;
    SelectedGroupID = 0;
    GroupSize_Threshold = 100;   // 10×10 block
    // Select light group cover initial position (X,Y)
    for (pattern light segment index LS_index = 1 to LS_Count) do
    {
        if (PTN_LS[LS_Index].Row == Y &&
            PTN_LS[LS_Index].Start <= X &&
            PTN_LS[LS_Index].End >= X
            PTN_LG[PTN_LS[LS_Index].GroupID].Size > GroupSize_Threshold)
        {
            SelectedGroupID = PTN_LS[LS_Index].GroupID;
            OverlapGroupFound = true;
            Break;
        }
    }
    // Find closest light segment
    if (OverlapGroupFound == false)
    {
        X_Diff = 0;
        Y_Diff = 0;
        X_Diff_min = 0;
        Distance = 0;
        MinDistance = (PatternWidth*PatternWidth) +
                      (PatternHeight*PatternHeight);
        MinDistance_LS_Index = 0;
        Distance_Threshold = 50;    // 5*5 + 5*5
        NearRange_MaxSize_GroupID = 0;
        DearRange_MaxSize = 0;
        CurrentSegGroupID = 0;
        for (pattern light segment index LS_Index = 1 to LS_Count) do
        {
            Y_Diff = Y - PTN_LS[LS_Index].Row;
            Y_Diff = Y_Diff*Y_Diff;
            X_Diff = X - PTN_LS[LS_Index].Start;
            X_Diff_Min = X_Diff * X_Diff;
            for (iC = PTN_LS[LS_Index].Start+1 to PTN_LS[LS_Index].End) do
            {
                X_Diff = X - iC;
                X_Diff = X_Diff * X_Diff;
                if (X_Diff < X_Diff_Min)
                    X_Diff_Min = X_Diff;
            }
            Distance = Y_Diff + X_Diff_Min;
            if (Distance < Distance_Threshold)
            {
                CurrentSegGroupID = PTN_LG[LS_Index].GroupID;
                if (PTN_LG[CurrentSegGroupID].Size > NearRange_MaxSize)
                {
                    NearRange_MaxSize_GroupID = CurrentSegGroupID;
                    NearRange_MaxSize = PTN_LG[CurrentSegGroupID].Size;
                }
            }
            if (Distance < MinDistance)
            {
                MinDistance = Distance;
                MinDistance_LS_Index = LS_Index;
            }
        }
    }
    if (NearRange_MaxSize > 0)
        SelectedGroupID = nearRange_MaxSize_GroupID;
    Else
        SelectedGroupID = PTN_LS[MinDistance_LS_Index].GroupID;
}
// Merge small and nearby regions
MergeSmallAndCloseRegions(Region[ ], RegionCount)
{
    WH_Threshold = 30;   // Width and height threshold
```

Step 908: Specific light source identification:

```
B_Threshold = 5;        // For use on boundary expansion
for (region index R from 1 to RegionCount) do
{
    Width = Region[R].Right – Region[R].Left;
    Height = Region[R].Bottom – Region[R].Top;
    if (Width == 0    || Height == 0)
        Continue;
    if (Width < WH_Threshold   ||   Height < WH_Threshold)
    {
        for (region index N from R+1 to RegionCount) do
        {
            Width = Region[N].Right – Region[N].Left;
            Height = Region[N].Bottom – Region[N].Top;
            if (Width < WH_Threshold   ||   Height < WH_Threshold)
            {
                // Check if Region R overlaps with expanded Region N
                if (Region[N].Left – B_Threshold) <= Region[R].Right &&
                   (Region[N].Right + B_Threshold) >= Region[R].Left &&
                   (Region[N].Top – B_Threshold) <= Region[R].Bottom &&
                   (Region[N].Bottom + B_Threshold) >= Region[R].Top)
                {
                    Region[R].Left = Min(Region[R].Left, Region[N].Left);
                    Region[R].right = Max(Region[R].Right, Region[N].Right);
                    Region[R].Top = Min(Region[R].top, Region[N].Top);
                    Region[R].Bottom = Max(Region[R].Bottom, Region[N].Bottom);
                }
            }
        }
    }
}
}
(X,Y) = InitPos(PatternWidth, PatternHeight, RC_Pattern, CbCrDiff_Pattern)
{
    X = 0; Y = 0;      Accu_X = 0;     Accu_Y = 0;     Accu_PixelCount = 0;
    ValueLevel[ ];   // Collect pixel information at different pixel values (0 ~ 255)
    Set data in ValueLevel[ ] to zero;
    for (iR from 0 to PatternHeight) do
    {
        for (iC from 0 to PatternWidth) do
        {
            P = iR * PatternWidth + iC;
            PixelMask = RC_Pattern[P];
            if (PixelMask > 0)
            {
                Pixel_Value = CbCrDiff_Pattern[P];
                ValueLevel[Pixel_Value].Row += iR;
                ValueLevel[Pixel_Value].Col += iC;
                ValueLevel[Pixel_Value].Count++;
                TotalPixelCount++;
            }
        }
    }
    Pixel_For_Initial_Pos = 0.2*TotalPixelCount;
    for (Pixel_Value from 255 to 1) do
    {
        if (ValueLevel[Pixel_Value].Count > 0)
        {
            Accu_X += ValueLevel[Pixel_Value].Col;
            Accu_Y += ValueLevel[Pixel_Value].Row;
            Accu_PixelCount += ValueLevel[Pixel_Value].Count;
        }
        if (Accu_PixelCount > Pixels_For_Initial_Pos)
        {
            X = Accu_X/Accu_PixelCount;
            Y = Accu_Y/Accu_PixelCount;
            Break;
        }
    }
}
```

If a light group 30 corresponding to point light source 24 is determined to exist by the above analyses (FIG. 9, step 910), the analysis continues to calculate the point light source location. If no appropriate light group 30 is detected, the analysis returns to step 900.

Figure 22:
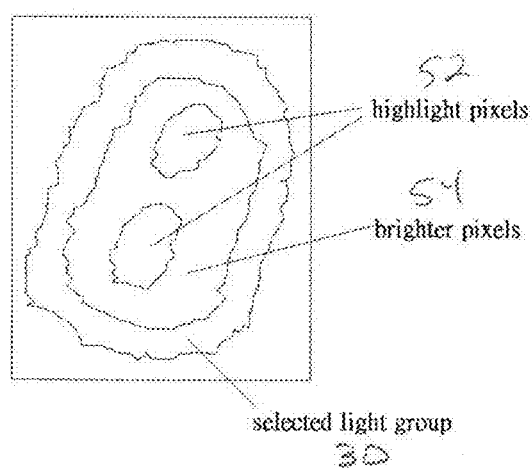
FIG. 22 shows a selected light group divided into three areas: a highlight area, a brighter area and a remaining area.

Based on the light group 30 selected in FIG. 9, step 908, the work of step 912 is to calculate the most appropriate position of the point light source 24 in a captured image frame 51. This work is done by the function LightPos( ) in the following algorithm for this step. For each light segment of the light group SelectedGroupID selected in step 908, LightPos( ) collects pixels either belonging to the highlight region 34 or an area not as bright as the highlight region 34 but brighter than the remaining area of the light group (see FIG. 22). The pixels belonging to the highlight region 34 will be called the highlight pixels 52 and the pixels belonging to the second area in FIG. 22 will be called the brighter pixels 54. The reason for doing this is to ensure that the computed position of the point light source 24 is as close to the center of the point light source 24 as possible. If the number of highlight pixels 52 is big enough (>100), the final position of the point light source 24 is computed as the average of the highlight pixels 52. If the number of highlight pixels 52 is zero, the final position of the point light source 24 is computed as the average of the brighter pixels 54. Otherwise, it is computed based on the ratio of highlight pixels 52 to brighter pixels 54. If the numbers of highlight pixels 52 and brighter pixels 54 are both zero, then the final position of the point light source 24 is set to (0, 0).

Step 912: Point light source 24 position calculation:

```
Input:
Y_Pattern = Pattern region of Y calculated in step 908;
H_Pattern = Pattern region of HC calculated in step 908;
    // HC = highlight channel, defined in step 904
SelectedGroupID = Light group ID from step 908;
PTN_LS[ ] = Light segments from step 908;
PTN_LG[ ] = Light groups from step 908;
Output:
RX, RY: final result of light source position;
[Step 912]
(LX, LY) = LightPos(PatternWidth, PatternHeight, Y_Pattern, H_Pattern, PTN_LS[ ],
            PTN_LG[ ], SelectedGroupID);
if (LX == 0  && LY == 0)
{
    RX = X;     // X = initial position computed in step 908
    RY = Y;     // Y = initial position computed in step 908
}
Else
{
    RX = LX;    // result returned by LightPos( )
    RY = LY;    // result returned by LightPos( )
} // End of step 6
// function to compute final position of the light source
(LX, LY) = LightPos(PatternWidth, PatternHeight, Y_Pattern, H_Pattern, PTN_LS[ ],
            PTN_LG[ ], SelectedGroupID)
{
    HAccu_X = 0;     HAccu_Y = 0;     H_Count = 0;     //highlight pattern
    BAccu_X = 0;     BAccu_Y = 0;     B_Count = 0;     // for brighter pixels position
    Light_Threshold = 220;   //for brighter light group region
    // find overlapping highlight pixels and brighter pixels
    for (pattern light segment index LS_Index = 1 to LS_Count) do
    {
        if (PTN_LS[LS_Index].GroupID == SelectedGroupID)
        {
            iR = PTN_LS[LS_Index].Row;
            for (iC = PTN_LS[LS_Index].Start to PTN_LS[LS_Index].End) do
            {
                P = iR * PatternWidth + iC;
                if (H_Pattern[P] >0)
                {
                    HAccu_X = iC;
                    HAccu_Y = iR;
                    H_Count++;
                }
                if (Y_Pattern[P] > Light_Threshold)
                {
                    BAccu_X += iC;
                    BAccu_Y += iR;
                    B_Count++;
                }
            }
        }
    }
    if (H_Count > 0 || B_Count > 0)
    {
        Ratio = H_Count/100;    // 100 -> 10x10 block, reasonable region
        if (Ratio < 1 && B_Count > 0)
        {
            if (H_Count == 0 )
            {
                LX = BAccu_X/B_Count;
                LY = BAccu_Y/B_Count;
            }
            else
            {
                LX = Ratio*HAccu_X/H_Count + (1.0 − Ratio)*BAccu_X/B_Count;
                LY = Ratio*HAccu_Y/H_Count + (1.0 − Ratio)*BAccu_Y/B_Count;
```

Step 912: Point light source 24 position calculation:

```
            }
         }
         else
         {
             LX = HAccu_X/H_Count;
             LY = HAccu_Y/H_Count;
         }
      }
      else
      { // abort this region
          LX = 0;
          LY = 0;
      }
}
```

Step 914 is to convert or map the image frame 51 position of the point light source 24 computed in step 912 to pointing/input device 12 cursor 21 position on a graphical user interface 17 such as a computer screen. Note that the resolution of the imaging device 14 is usually different from the resolution of the graphical user interface 17. Hence, one cannot use the difference between the current position and the previous position of the point light source 24 to calculate a displacement path for the pointing/input device 12 position directly, but rather a scaling function is required.

This step first uses results from step 908 and step 912 to compute the global position of the point light source 24 in a captured image frame 51 if a frame rate of the imaging device 14 is greater than 5. If the frame rate is not greater than 5, the pointing/input device 12 will not be moved. In this event, a function ScaleMovement( ) is called to compute the differences between current global position and a succeeding global position of the point light source 24 in x and y. In other words, the speed of the point light source 24 as calculated from sequential image frames 51 is used to adjust a magnitude of displacement of a cursor 21 or other icon representing a position of the point light source 24 in a graphical user interface 17.

The differences are scaled non-linearly to ensure the entire display surface can be mapped by points in the imaging device 14's sensor through this scaling process. The scaled differences are then used as displacement x- and y-components to move the pointing/input device 12 cursor 21 from a previous location to a new location. To ensure that the cursor is moved in a visually continuous fashion, a function LinearinterpolateMousePosition( ) is called to compute intermediate points between the current position of the cursor 21 and its new location, so that by setting the cursor 21 at these intermediate points sequentially, a smooth movement of the cursor from its current position to its new position is provided. A representative algorithm for this process is shown below.

Step 914: Point light source 24 image frame 51 position converted to pointing/input device 12 position:

```
Input:
Global_Pattern_X = PatternRegion.Left;   // the selected light
                                            group in step 908
Global_Pattern_Y = PatternRegion.Top;    // the selected light
                                            group in step 908
RX, RY: from step 912;
MouseSpeed = 8;    // 1 to 16 for adjustment; set by user
TimeStamp: current time stamp;
Output:
```

Step 914: Point light source 24 image frame 51 position converted to pointing/input device 12 position:

```
Serial mouse positions;
Global variables:
Prior_TimeStamp: prior frame time stamp;
Prior_GX: prior frame global result RX from step 912;
Prior_GY; prior frame global result RY from step 912;
[Step 914]
SD_X, SD_Y: Scaled differences;
TimeStamp = clock( );       // get current time
if ((TimeStamp - Prior_TimeStamp) < 200)    // tolerance = 5 frames
{
    GX = Global_Pattern_X + RX;
    GY = Global_Pattern_Y + RY;
    (SD_X, SD_Y) = ScaleMovement(Prior_GX, Prior_GY, GX, GY);
    if (SD_X != 0 || SD_Y != 0)
        LinearInterpolateMousePosition(SD_X, SD_Y);
    Prior_GX = GX;
    Prior_GY = GY;
    Prior_TimeStamp = TimeStamp;
}
Functions:
(SD_X, SD_Y) = ScaleMovement(Prior_GX, Prior_GY, GX, GY)
{
    Diff_X = GX - Prior_GX;
    Diff_Y = GY - Prior_GY;
    AbsDiff_X = Abs(Diff_X);
    AbsDiff_Y = Abs(Diff_Y);
    Diff = Max(AbsDiff_X, AbsDiff_Y);
    if (Diff > 6)
    {
        DiffRatio = log(pow(Diff/6, MouseSpeed));
        if (DiffRatio < 1)
            DiffRatio = 1;
        SD_X = Diff_X*DiffRatio;
        SD_Y = Diff_Y*DiffRatio;
    }
    SD_X = Diff_X;
    SD_Y = Diff_Y;
}
LinearInterpolationMousePosition(SD_X, SD_Y)
{
    (MX, MY) = GetCursorPos( );    // system function call
                                   // get current mouse position on screen
    InterpolationSteps = Max(Abs(SD_X), Abs(SD_Y));
    if (InterpolationSteps > 12)
        InterpolationSteps = 12;
    Delta_X = SD_X/InterpolationSteps;
    Delta_Y = SD_Y/InterpolationSteps;
    for (C=1 to InterpolateStepSize) do
    {
        Mouse_X = MX + C*Delta_X;
        Mouse_Y = MY + C*Delta_Y;
        SetCursorPos(Mouse_X, Mouse_Y);    // system function call
    }
} // End of step 914
```

In the above calculations, the purpose of the function ScaleMovement(Prior_GX, Prior_GY, GX, GY) is to ensure that the movement of the cursor 21 on graphical user interface 17 reflects the movement of the point light source 24 in 3D space, i.e. the speed and location of the cursor 21 are proportional to the speed and location of the point light source 24. The purpose of the function LinearInterpolation-MousePosition(SD_X, SD_Y) is to allow an operator O to see a smooth and seamless moving process for cursor 21 between discrete sampled points (current and succeeding global positions).

The light tracking process for the selected captured image frame 51 is done once the cursor 21 position is computed and the cursor is moved to the new location. The process is then repeated for succeeding captured image frames 51*b*, 51*c*, . . . 51*x*. As noted above, other functions of the pointing/input device 12 such as left click, right click, dragging, and scrolling are handled in the conventional, familiar fashion as with any pointing/input device 12 such as a computer mouse, with the distinction that the cursor 21 position on graphical user interface 17 is rendered according to the method set forth above instead of by the displacement detection system of the pointing/input device 12.

Summarizing, the present disclosure provides a pointing/input system including an input or pointing device 12 which can conveniently be transitioned between use in conventional surface mode and in air mode, i.e. not requiring a surface for operation. The invention disclosed in this document makes a traditional pointing/input device 12 such as an optoelectronic mouse more powerful by providing more operating modes (air mode in addition to surface mode). Exemplary advantages include allowing an operator to input gesture commands to a computing device, a "smart" television, and the like via a substantially conventional, unmodified computer mouse even when a suitable surface S allowing use of the mouse displacement detection system is not available. The system and method of the present disclosure also provide a better drawing environment for a user using a conventional pointing/input device 12 such as a computer mouse, since drawing by making in three-dimensional movements in space with a computer mouse is significantly easier and more convenient than attempting the same tasks with a conventional computer mouse translated over a surface or even using a touchpad or panel.

One of ordinary skill in the art will recognize that additional embodiments of the invention are also possible without departing from the teachings herein. For example, the preceding discussion is directed primarily to a process for effecting 2D pointing/command input using the pointing/input device 12 as described. However, the skilled artisan will readily appreciate that the above-described methods and devices are readily adaptable to 3D pointing/command input. For example, the imaging device 14 described above may be configured or adapted to provide image frames from which suitable software may calculate a depth and normal vector of a cursor 21, for display on a graphical user interface 17. A variety of multi-view imaging systems are known in the art and contemplated for use herein, such as the devices and systems disclosed in U.S. Published Patent Appl. No. 2010/0289874, U.S. Published Patent Appl. No. 2011/0310230, and U.S. patent application Ser. No. 13/921, 739, the disclosures of each of which are incorporated in their entirety herein by reference, which provide multi-view images to a single-lens recording device for further processing. Likewise, a number of methods for rendering three-dimensional images by interlacing information from multiple two-dimensional views of a same scene are known, such as the methods disclosed in the above references.

Thus, the foregoing description is presented for purposes of illustration and description of the various aspects of the invention, and one of ordinary skill in the art will recognize that additional embodiments of the invention are possible without departing from the teachings herein. This detailed description, and particularly the specific details of the exemplary embodiments, is given primarily for clarity of understanding, and no unnecessary limitations are to be imported, for modifications will become obvious to those skilled in the art upon reading this disclosure and may be made without departing from the spirit or scope of the invention. Relatively apparent modifications, of course, include combining the various features of one or more figures with the features of one or more of other figures. All such modifications and variations are within the scope of the invention as determined by the appended claims when interpreted in accordance with the breadth to which they are fairly, legally and equitably entitled.

What is claimed is:

1. A computing system for tracking a pointing/input device, comprising:
   a computing device having at least one processor, at least one memory, and at least one graphical user interface;
   at least one pointing/input device including a visible point light source emitting light having a wavelength defining a predetermined color;
   an imaging device operably linked to the computing device and configured for capturing a plurality of sequential image frames each including a view of the visible point light source held and/or moved in a three-dimensional space and within a field of view of the imaging device; and
   at least one computer program product operable on the computing device processor;
   wherein the at least one computer program product includes executable instructions for calculating from the plurality of sequential image frames at least a position and/or a motion of the visible point light source, and for rendering on the graphical user interface a visual marker corresponding to the position and/or the motion of the at least one pointing/input device by:
      analyzing each of said plurality of sequential image frames to identify one or more regions having an increased color intensity;
      applying a first filtering action to one or more regions of said plurality of sequential image frames to remove areas having a decreased color intensity;
      applying a second filtering action to one or more areas of said regions of said plurality of sequential image frames regions having the increased color intensity to remove areas having a color that is other than said predetermined color and to isolate areas having said predetermined color; and
      identifying a position of said visible point light source according to said isolated areas having said predetermined color.

2. The system of claim 1, wherein the at least one computer program product includes executable instructions for mapping and displaying in the graphical user interface the position and/or the motion of the at least one pointing/input device within the field of view of the imaging device, comprising:
   determining a position of the visible point light source in each of said plurality of sequential image frames;

converting the determined position of the visible point light source into a position of the visual marker in the graphical user interface; and displaying the visual marker in the graphical user interface.

3. The system of claim 2 wherein the at least one computer program product includes executable instructions for mapping said position and/or motion of the visible point light source to a position and/or motion of the visual marker on the graphical user interface by:

determining a first global position of the visible point light source in a first of the plurality of sequential image frames;

determining a next global position of the visible point light source in a next of the plurality of sequential image frames;

calculating a difference between the first global position and the next global position of the visible point light source;

scaling the calculated difference in a non-linear fashion;

calculating one or more intermediate positions between the first global position and the next global position of the visible point light source; and moving the visual marker displayed in the graphical user interface along a determined displacement path passing through the first scaled global position, the intermediate global positions, and the next scaled global position.

4. In a computing system environment, a method for tracking a pointing/input device, comprising:

holding and/or moving at least one pointing/input device including a visible point light source in a three-dimensional space disposed within a field of view of an imaging device operably connected to a computing device having at least one processor, at least one memory, and at least one graphical user interface, the visible point light source emitting light having a fixed wavelength defining a predetermined color;

by the imaging device, capturing a plurality of sequential image frames each including a view of a position of the visible point light source within the imaging device field of view;

from the captured plurality of sequential image frames, calculating at least a position and a motion of the visible point light source by the steps of:

analyzing each of said plurality of sequential image frames to identify one or more regions having an increased color intensity;

applying a first filtering action to one or more regions of said plurality of sequential image frames to remove areas having a decreased color intensity;

applying a second filtering action to one or more areas of said regions of said plurality of sequential image frames regions having the increased color intensity to remove areas having a color that is other than said predetermined color and to isolate areas having said predetermined color; and identifying a position of said visible point light source according to said isolated areas having said predetermined color; and rendering a visual marker on the graphical user interface corresponding to the position and/or the motion of the visible point light source.

5. The method of claim 4, further including mapping the motion of the visible point light source to a predetermined pointing and/or input command.

6. The method of claim 5, including mapping said position of the visible point light source to a position of the at least one pointing/input device on the graphical user interface by the steps of:

determining a first global position of the visible point light source in a first of the plurality of sequential image frames;

determining a next global position of the visible point light source in a next of the plurality of sequential image frames;

calculating a difference between the first global position and the next global position of the visible point light source;

scaling the calculated difference in a non-linear fashion;

calculating one or more intermediate positions between the first global position and the next global position of the visible point light source; and moving the visual marker displayed in the graphical user interface along a determined displacement path passing through the first scaled global position, the intermediate global positions, and the next scaled global position.

7. The method of claim 4, including the steps of:

determining a position of the visible point light source in each of said plurality of sequential image frames;

converting the determined position of the visible point light source into a position of the visual marker in the graphical user interface; and displaying the visual marker in the graphical user interface.

8. A non-transitory computer program product for loading on a computing device to render a position and/or motion of a visual marker on a graphical user interface, the computer program product having executable instructions for:

analyzing digital data converted by an imaging device from a plurality of captured sequential image frames providing a view of a pointing/input device including a visible point light source having a wavelength defining a predetermined color, the pointing/input device being held and/or moved in three-dimensional space within a field of view of the imaging device;

determining a position of the visible point light source in each of said plurality of sequential image frames by:

analyzing each of said plurality of sequential image frames to identify one or more regions having an increased color intensity;

applying a first filtering action to one or more regions of said plurality of sequential image frames to remove areas having a decreased color intensity;

applying a second filtering action to one or more areas of said regions of said plurality of sequential image frames regions having the increased color intensity to remove areas having a color that is other than said predetermined color and to isolate areas having said predetermined color; and identifying a position of said visible point light source according to said isolated areas having said predetermined color;

converting the determined position of the visible point light source into a position of the visual marker in the graphical user interface; and displaying the visual marker in the graphical user interface.

9. The computer program product of claim 8, further including executable instructions that map said position and/or motion of the visible point light source to a position and/or motion of the visual marker on the graphical user interface by:

determining a first global position of the visible point light source in a first of the plurality of sequential image frames;

determining a next global position of the visible point light source in a next of the plurality of sequential image frames;

calculating a difference between the first global position and the next global position of the visible point light source;

scaling the calculated difference in a non-linear fashion;

calculating one or more intermediate positions between the first global position and the next global position of the visible point light source; and moving the visual marker displayed in the graphical user interface along a determined displacement path passing through the first scaled global position, the intermediate global positions, and the next scaled global position.

10. A non-transitory computer program product for loading on a computing device to render a position and/or motion of a visual marker on a graphical user interface, comprising:

a first component for analyzing digital data converted from a plurality of captured sequential image frames each including a view of a visible point light source having a wavelength defining a predetermined color and for determining a position of the at least one point light source in each of said plurality of sequential image frames, the first component being configured to analyze digital data of each of said plurality of sequential image frames and to identify one or more regions having an increased color intensity corresponding to the visible point light source predetermined color, to apply at least one filtering action to digital data of one or more regions of said plurality of sequential image frames to remove areas having a decreased color intensity, to remove areas having a color that is other than said predetermined color, and to isolate areas having said predetermined color;

a second component for converting the determined position of the visible point light source into a position of the visual marker in the graphical user interface; and;

a third component for displaying the visual marker in the graphical user interface.

11. The computer program product of claim 10, wherein the second component is configured to determine a global position of the visible point light source in digital data from one of the plurality of sequential image frames and to calculate a difference between the global position of the visible point light source in the one of the sequential image frames and a succeeding global position of the visible point light source in a succeeding image frame of the plurality of sequential image frames.

12. The computer program product of claim 11, wherein the second component is further configured to scale the calculated difference in a non-linear fashion, to calculate one or more intermediate positions between the global position and the succeeding global position of the at least one point light source.

13. The computer program product of claim 12, wherein the third component is configured to render the visual marker in the graphical user interface and to move the rendered visual marker along a calculated displacement path passing through the scaled global position, the intermediate global positions, and the succeeding scaled global position.

* * * * *